(12) United States Patent  
Arya et al.

(10) Patent No.: US 12,013,865 B1  
(45) Date of Patent: Jun. 18, 2024

(54) TREND AND SEASONALITY DECOMPOSITION

(71) Applicant: International Business Machines Corporation, Armonk, NY (US)

(72) Inventors: Vijay Arya, Gurgaon (IN); Mudhakar Srivatsa, White Plains, NY (US); Joshua Rosenkranz, White Plains, NY (US); Petros Zerfos, New York, NY (US); Xuan-Hong Dang, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/181,594

(22) Filed: Mar. 10, 2023

(51) Int. Cl.
G06F 16/24 (2019.01)
G06F 7/556 (2006.01)
G06F 16/2458 (2019.01)

(52) U.S. Cl.
CPC .......... *G06F 16/2477* (2019.01); *G06F 7/556* (2013.01)

(58) Field of Classification Search
None
See application file for complete search history.

(56) References Cited

U.S. PATENT DOCUMENTS

| | | |
|---|---|---|
| 11,398,959 B2 | 2/2022 | Yelahanka Raghuprasad et al. |
| 2022/0076164 A1 | 3/2022 | Conort et al. |
| 2022/0292308 A1 | 9/2022 | Schwiep et al. |
| 2022/0335314 A1* | 10/2022 | Doan Huu ............. G06N 20/00 |

FOREIGN PATENT DOCUMENTS

CN 111242210 A 6/2020

OTHER PUBLICATIONS

Beltrán et al., "Framework for collaborative intelligence in forecasting day-ahead electricity price." Applied Energy 306, 118049 (Year: 2022): pp. 1-25.
Cleveland et al., "STL: A Seasonal-Trend Decomposition Procedure Based on Loess." Journal of Official Statistics, vol. 6. No. 1 (Year: 1990): pp. 3-33.
Github "Neural Prophet" https://github.com/ourownstory/neural_prophet (Retrieved Jan. 3, 2023) 5 pages.
Github "Slundberg" https://github.com/slundberg/shap (Retrieved Jan. 3, 2023) 13 pages.
Lundberg et al., "A unified approach to interpreting model predictions." Advances in neural information processing systems 30 (Year: 2017): 10 pages.
Wikipedia "Shapely Value" https://en.wikipedia.org/wiki/Shapley_value (Retrieved Jan. 3, 2023) 8 pages.

* cited by examiner

*Primary Examiner* — Baoquoc N To
(74) *Attorney, Agent, or Firm* — CANTOR COLBURN LLP; Steven Bouknight (57) ABSTRACT

Aspects of the invention include techniques for decomposing trend and seasonality components in a forecast of parametric time series data. A non-limiting example method includes receiving time series data that includes a plurality of values taken over a first period of time. A forecast is generated using the time series data. The forecast can include one or more predicted values over a second period of time. The forecast is decomposed into N components and $2^N$ coalitions are defined for the N components. A coalition value is determined for each coalition of the $2^N$ coalitions.

16 Claims, 4 Drawing Sheets

TREND AND SEASONALITY DECOMPOSITION

BACKGROUND

The present invention generally relates to predictions over time series data, and more specifically, to providing a trend and seasonality decomposition in a forecast of parametric time series data.

Time series data contains a sequence of data points (e.g., measurements, observations, etc.) collected over successive time durations (e.g., hourly, daily, weekly, monthly, annually, etc.). Time series data can track changes over milliseconds, days, or even years. For example, monthly rainfall, daily open stock prices, annual revenue, current wind speed, etc., are examples of time series data typically tracked over months, days, years, and seconds, respectively.

Most time series data occurring in domains such as healthcare, finance, retail, weather, and economics exhibit one or both of trend and seasonality components. Trend refers to a pattern in time series data to relatively higher or lower values over a long period of time. In other words, a trend is observed when there is an increasing or decreasing slope in the time series data. Seasonality refers to repeating patterns or cycles of behavior in time series data. For example, hotel occupancy rates spike each year during national holidays and over the summer.

Time series forecasting is the process of analyzing time series data using statistics and/or modeling to make predictions for a future state. Forecasting can be used, for example, to determine the volume of raw components needed by a manufacturing process for a given day. Some common modeling techniques for forecasting includes autoregression modeling and moving average modeling.

Recently, various machine learning techniques have been used for time series data forecasting to improve prediction accuracy and responsiveness. Machine learning-based forecasting models can be trained on historical values of time series data to predict future values of the time series data. There are numerous types of machine learning-based forecasting models, including those having exponential smoothing, which uses a weighted sum of past observations of the time series data to make predictions. A machine learning model can be trained from example datasets on how a target (e.g., a predicted outcome) is associated with one or more features of the dataset, often using a number of statistical techniques.

SUMMARY

Embodiments of the present invention are directed to techniques for decomposing trend and seasonality components in a forecast of parametric time series data. A non-limiting example method includes receiving time series data that includes a plurality of values taken over a first period of time. A forecast is generated using the time series data. The forecast can include one or more predicted values over a second period of time. The forecast is decomposed into N components and $2^N$ coalitions are defined for the N components. A coalition value is determined for each coalition of the $2^N$ coalitions. Advantageously, decomposing trend and seasonality components in this manner enables an efficient means to identify and quantify the relative and absolute contributions of the components to a statistical measure (e.g., error of fit, confidence intervals, specific prediction value(s), etc.).

In some embodiments, generating the forecast includes determining the one or more predicted values using a simple exponential smoothing model trained on the plurality of measured values. Advantageously, forecasting in this manner enables a user to control, via exponential smoothing coefficients, the relative importance of relatively recent vs. relative old data in the data set. In other words, how much weight to give recent data vs. older data, and the degree to which that weight falls off.

In some embodiments, the N components include a trend component and a seasonality component. Other components are possible. Advantageously, any desired component(s) of a given time series data can be defined, allowing flexibility in forecasting analysis.

In some embodiments, the $2^N$ coalitions include a base coalition absent the N components, a complete coalition having all N components, and a plurality of coalitions corresponding to all possible remaining combinations of the N components. In this manner, a coalition is built for each possible sub-combination of the underlying components.

In some embodiments, each coalition of the $2^N$ coalitions is defined using a unique model definition. In this manner, each coalition can be separately modeled and compared to one or more other coalitions within a coalition game framework.

In some embodiments, determining the coalition value for a respective coalition includes determining a Shapley value for the coalition. In some embodiments, the Shapley value for each respective coalition defines a contribution of the respective coalition to at least one of an error of fit and a predicted value of the forecast. In this manner, the relative contributions of any component of interest (e.g., trend, seasonality, etc.) can be compared in absolute or relative terms.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified.

In the accompanying figures and following detailed description of the described embodiments of the invention, the various elements illustrated in the figures are provided with two or three-digit reference numbers. With minor exceptions, the leftmost digit(s) of each reference number correspond to the figure in which its element is first illustrated.

DETAILED DESCRIPTION

Current machine learning-based forecasting techniques are somewhat limited. Specifically, current machine learning-based forecasting techniques do not allow users to assess the relative impact of trend versus seasonality with a forecasting model of time series data. Therefore, a user may have a difficult time understanding and interpreting the results (e.g., output for next time step) from a time series forecasting model. First, while a predicted "next" time series value(s) may be graphed as one or more data points over time and/or otherwise visualized for a user (e.g., analyst, domain expert, etc.), the output (e.g., graph) itself does not provide the user with an understanding of what factors, within the model, are contributing to the predicted output value. In particular, existing time series decomposition techniques, machine-learning based or otherwise, do not allow users to assess the relative impact of trend versus seasonality during modeling or forecasting of the time series. Therefore, a user may have a difficult time understanding and interpreting the results output from a time series forecasting model One or more embodiments of the present invention address one or more of the above-described shortcomings by providing computer-implemented methods, computing systems, and computer program products for providing a trend and seasonality decomposition in a forecast of parametric time series data. In some embodiments, the relative strength of trend and seasonality in a forecast is determined using game theory based Shapley values. In some embodiments, the Shapley values associated with trend and seasonality in a time series dataset are computed by defining a coalition game between multiple subsets of the time series data, where each time series subset is treated as a "player" with different trend and seasonality parameters. In some embodiments, the coalition game leverages a Holt-Winter triple exponential smoothing algorithm between trend and seasonality with a base case of simple exponential smoothing.

In some embodiments, a plurality of models corresponding to possible coalitions are generated. In some embodiments, a time series is modeled as a coalition game between high-level quantities (e.g., trend and seasonality) and two or more time series model variants are defined as coalitions of the high-level quantities. Based on the coalitions, the Shapley values of the trend and the seasonality for the various mathematical quantities of the time series can be determined. While generally described within the context of time series forecasting, aspects of the present disclosure can be used to compute the relative contributions of trend and seasonality in the computation of forecasts at a future time index, confidence bounds and intervals, error of fit, etc., for a range of parametric time series models (e.g., Holt-winter, ARIMA, BATS, etc.).

Advantageously, providing a native mechanism to quantify the relative contributions of trend and seasonality with a time series model according to one or more embodiments helps build trust with users and provides those users with useful insights about the time series data and the model. For example, a commonly asked question by a business owner or domain expert presented with an unexpected forecast made by a model may be whether trend or seasonality was a dominant factor in the forecast. Aspects of the present disclosure can relate to a user, plainly, the relative strengths of trend and seasonality within time series data.

Additionally, trend and seasonality decompositions generated as described herein can be used by downstream processes, such as change point detection systems, to detect inflection points where trend and seasonality of a time series change over time. In change point detection applications, users generally wish to compare the relative strengths of trend and seasonality for two (or more) different parts of the time series. Notably, change point detection is straightforward when the relative strengths of trend and seasonality are determined according to one or more embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
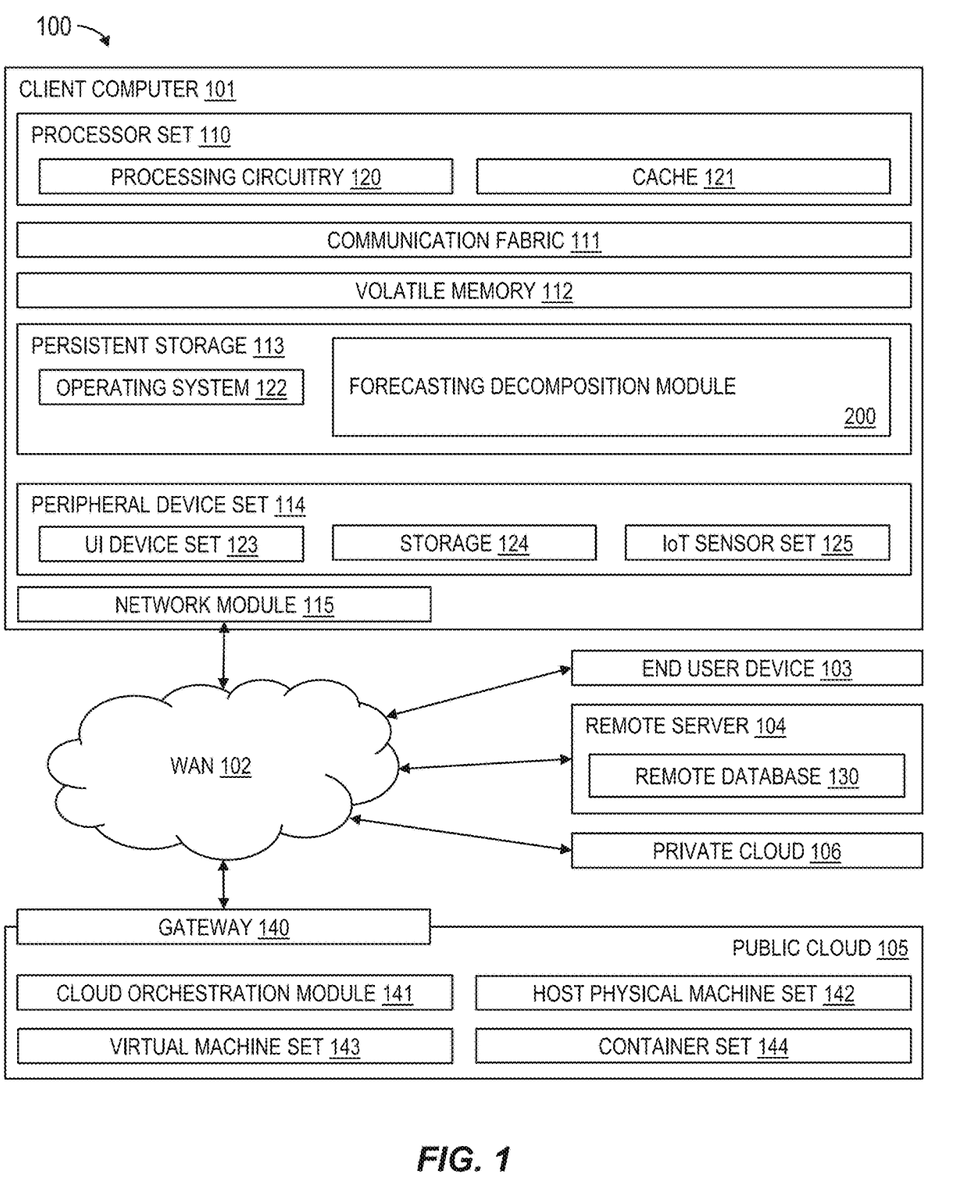
FIG. 1 depicts a block diagram of an example computing environment for use in conjunction with one or more embodiments of the present invention.

Referring now to FIG. 1, computing environment 100 contains an example of an environment for the execution of at least some of the computer code involved in performing the inventive methods, such as forecasting decomposition module 200 (also referred to herein as block 200). In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

It is to be understood that the block diagram of FIG. 1 is not intended to indicate that the computing environment 100 is to include all of the components shown in FIG. 1. Rather, the computing environment 100 can include any appropriate fewer or additional components not illustrated in FIG. 1 (e.g., additional memory components, embedded controllers, modules, additional network interfaces, etc.). Further, the embodiments described herein with respect to the computing environment 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
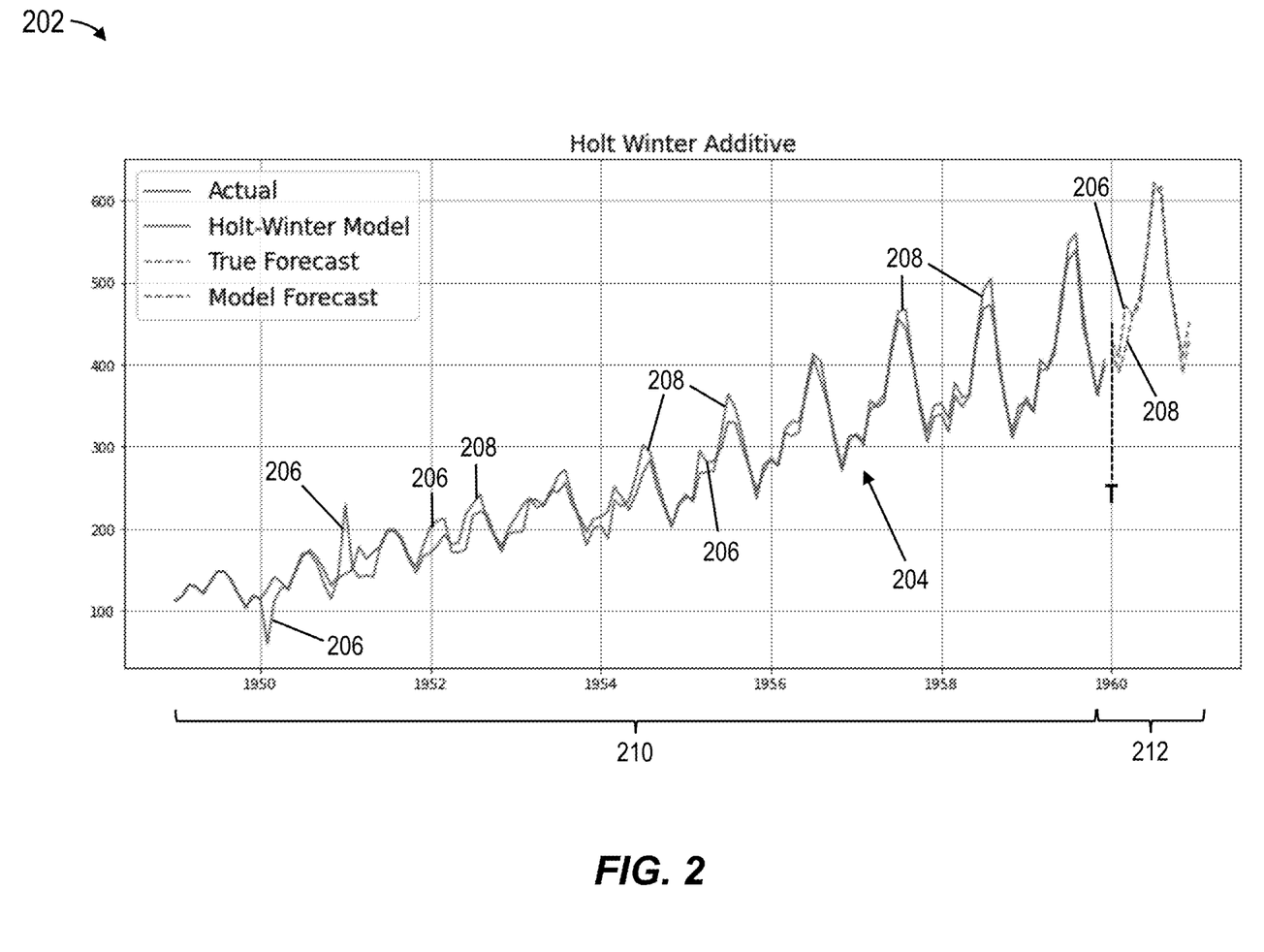
FIG. 2 depicts a graphical representation of an example forecast generated for an example time series dataset in accordance with one or more embodiments of the present invention.

FIG. 2 depicts a graphical representation of an example forecast 202 generated for an example time series dataset 204 in accordance with one or more embodiments of the present invention (i.e., an output of the forecasting decomposition module 200). The time series dataset 204 can include any parametric time series data, for example, the number of passenger airline flights between 1950 and 1959. The forecast 202 and time series dataset 204 are illustrative only, it should be understood that forecasts can be made for any arbitrary dataset and all such constructions are within the contemplated scope of this disclosure.

As shown in FIG. 2, a fit 206 is compared against the true (actual) data 208 over a first interval of time defining a training data set 210 (e.g., between the years 1950 and 1959). In some embodiments, the fit 206 is derived from a parametric model. In some embodiments, the parametric model is a Holt-Winter model. Other parametric models, such as double exponential modeling, autoregressive integrated moving average (ARIMA) modeling, etc., are possible. In some embodiments, the fit 206 is used to make a prediction of one or more future data values 212 over a second interval of time (also referred to as the forecast period). Observe that the fit 206 is not a perfect match to the true data 208. The difference between the fit 206 and the true data 208 represents the error of fit. Error of fit can be quantified according to one or more known techniques, such as, for example, Root Mean Square Error (RMSE), Mean Absolute Percentage Error (MAPE), etc.

Figure 3A:
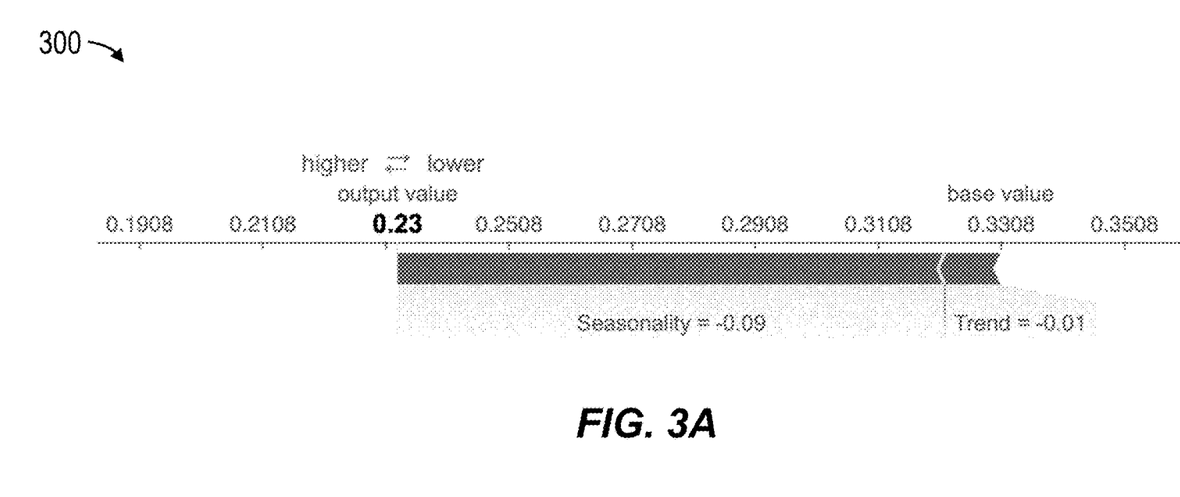
FIG. 3A depicts an example error of fit measured using Mean Absolute Percentage Error (MAPE) at a time "T" in FIG. 2 in accordance with one or more embodiments.

FIG. 3A illustrates an example error of fit 300 measured using MAPE at a time "T" in FIG. 2 in accordance with one or more embodiments. As shown in FIG. 3A, the mean absolute percentage error of the fit 206 at "T" (here, roughly 1960) was 0.23. In some embodiments, the contributions of seasonality and trend to the error of fit 300 measurement are determined and shown alongside the mean absolute percentage error of the fit 206. The actual determination of the seasonality and trend contributions is discussed in greater detail herein. Continuing from the previous example, the contribution of seasonality to the error of fit 300 was −0.09, and the contribution of trend to the error of fit 300 was −0.01. Combining these values results in shifting the base error of fit from 0.3308 to 0.23 (i.e., a reduction in the error of fit). In other words, the error of fit 300 of the fit 206 would have been 0.3308 if trend and seasonality were excluded from the forecast model. Moreover, FIG. 3A displays the relative importance in contributions between seasonality and trend for reducing the error of fit 300.

Figure 3B:
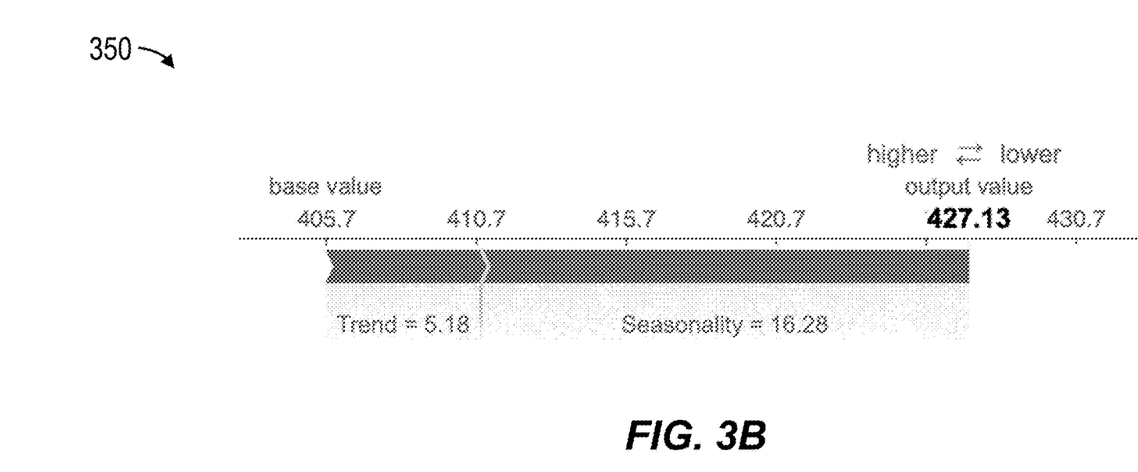
FIG. 3B depicts example Shapley contributions to a forecast (prediction) at a time "T" in FIG. 2 in accordance with one or more embodiments.

FIG. 3B illustrates example Shapley contributions 350 to a forecast (prediction) at a time "T" in FIG. 2 in accordance with one or more embodiments. As shown in FIG. 3B, the total Shapley contribution 350 to the forecast at "T" (here, roughly 1960) was 21.43 (e.g., 427.13 less 405.7). In some embodiments, the individual Shapley contributions 350 of seasonality and trend to a forecast are determined and shown alongside the forecast. The actual determination of the Shapley contributions of seasonality and trend is discussed in greater detail herein. Continuing from the previous example, the Shapley contribution of seasonality to the predicted value was 16.28, and the Shapley contribution of trend to the predicted value was 5.18. Combining these values results in shifting the predicted value from 405.7 to 427.13. In other words, the forecasted value at time "T" would have been 405.7 if trend and seasonality were excluded from the forecast model. Moreover, FIG. 3B displays the relative importance in Shapley contributions between seasonality and trend for shifting the predicted value at "T".

Note for completeness that the time "T" in FIGS. 3A and 3B is selected for ease of illustration and discussion only. In some embodiments, the time "T" can be arbitrarily moved, using, for example, a user interface (e.g., the peripheral device set 114 of the computing environment 100). In some embodiments, the determination of trend and seasonality contributions to error of fit (refer to FIG. 3A) and forecasted values (refer to FIG. 3B) will update for each new selection of the time "T". In this manner, a user of the computing environment 100 can determine the contributions (actual and relative) of trend and seasonality to an error of fit and/or to a forecast at any point of time within a data set. Advantageously, the user can easily see, by moving the time "T" through the data set, how the relative contributions of trend and seasonality have evolved over time. For example, the user can identify periods of time in a data set where seasonality is dominant, or conversely, periods where trend is dominant. Moreover, trend and/or seasonality contributions can be determined over a period of time (rather than for a single specific time "T") by computing the sum of those components at each point $T_x$ in the range. For example, the total contribution of trend to a portion of the data set from 1954 to 1958 can be computed by finding the sum of the trend contributions to error of fit and/or forecasted values over that period of time.

Turning now to the determination of trend and seasonality contributions to error of fit (refer to FIG. 3A) and forecasted values (refer to FIG. 3B), in some embodiments, a game is modeled between trend and seasonality with a base case of simple exponential smoothing. In some embodiments, the base case of simple exponential smoothing is modeled using Holt-Winter triple exponential smoothing. An example Holt-Winter triple exponential smoothing model is provided in Equation (1):

$$y_{t+h|t} = l_t + h b_t + s_{t+h-m(k+1)}$$

$$l_t = \alpha(y_t - s_{t-m}) + (1-\alpha)(l_{t-1} + b_{t-1})$$

$$b_t = \beta^*(l_t - l_{t-1}) + (1-\beta^*)b_{t-1}$$

$$s_t = \gamma(y_t - l_{t-1} - b_{t-1}) + (1-\gamma)s_{t-m}, \quad (1)$$

where $l_t$ denotes the estimate of the "level" (or smoothed value) of the series at time t (e.g., the base case without trend and seasonality components), $b_t$ denotes an estimate of the trend (or slope) contribution at t, and $s_t$ denotes an estimate of the seasonality contribution at t. In addition, h denotes the number of timesteps ahead to be forecasted, m is the length of the seasonality, $\alpha$, $\beta$, and $\gamma$ denote the smoothing factor coefficients (e.g., how much importance is assigned to recent measurements vs. older measurements), and $y_t$ denotes the time series value at time t. Observe that level, trend, and seasonality are intertwined (mutually co-dependent), meaning that for example, trend and seasonality components appear in the level equation.

To compute Shapley values for N competing quantities, $2^N$ individual coalition models are defined and the value of each coalition is determined. For example, when computing Shapley values for trend and seasonality (e.g., two players, or N=2), four models corresponding to $2^2$ possible coalitions are defined according to the following table:

TABLE 1

Coalition Definitions

| | Coalition | Corresponding Holt-Winter Model Definition |
|---|---|---|
| 1 | Null Set (no trend, no seasonality) | $\hat{y}_{t+h|t} = \ell_t$ <br> $\ell_t = \alpha y_t + (1 - \alpha)\ell_{t-1}$ |
| 2 | Trend, no seasonality | $\hat{y}_{t+h|t} = \ell_t + hb_t$ <br> $\ell_t = \alpha y_t + (1 - \alpha)(\ell_{t-1} + b_{t-1})$ <br> $b_t = \beta^*(\ell_t - \ell_{t-1}) + (1 - \beta^*)b_{t-1}$ |
| 3 | Seasonality, no trend | $\hat{y}_{t+h|t} = \ell_t + s_{t+h-m(k+1)}$ <br> $\ell_t = \alpha(y_t - s_{t-m}) + (1 - \alpha)\ell_{t-1}$ <br> $s_t = \gamma(y_t - \ell_{t-1}) + (1 - \gamma)s_{t-m}$ |
| 4 | Trend and Seasonality | $\hat{y}_{t+h|t} = \ell_t + hb_t + s_{t+h-m(k+1)}$ <br> $\ell_t = \alpha(y_t - s_{t-m}) + (1 - \alpha)(\ell_{t-1} + b_{t-1})$ <br> $b_t = \beta^*(\ell_t - \ell_{t-1}) + (1 - \beta^*)b_{t-1}$ <br> $s_t = \gamma(y_t - \ell_{t-1} - b_{t-1}) + (1 - \gamma)s_{t-m}$ |

Once the coalitions are defined, corresponding Shapley values can be determined for each coalition according to Equation (2):

$$shapley(i) = \sum_{S \subseteq N \setminus \{i\}, s=|S|} \frac{(n-s-1)!s!}{n!} (v(S \cup \{i\}) - v(S)) \quad (2)$$

where v(S) is the worth of coalition S.

Here, S refers to a coalition of players. For instance, Table 1 shows all possible coalitions with two players: Trend and Seasonality, where v(S) refers to a well-defined mathematical quantity of interest corresponding to a coalition of players S. For instance, while estimating the relative contributions of trend and seasonality in the forecast, v(S) refers to the forecast value obtained by fitting the data with a model built using coalition S (Table 1). On the other hand, while computing the relative contributions of trend and seasonality in the error of fit, v(S) refers to the error of fit value obtained by fitting the data with a model built using coalition S. Similarly, v(S) could refer to other mathematical quantities such as a confidence bound or an interval in the forecast.

In some embodiments, the corresponding Shapley values (that is, the relative contribution) for each of the N competing quantities (e.g., trend and seasonality) is displayed and/or otherwise provided in a user interface. For example, the contributions of trend and seasonality can be displayed alongside a forecast graph (refer to FIGS. 3A and 3B).

In some embodiments, the contributions of trend and seasonality can be used to make one or more changes in a downstream system and/or application. For example, consider a manufacturing facility where product requirements and/or raw material deliveries are forecasted. In some embodiments, the contributions of trend and seasonality to the forecast, determined according to one or more embodiments, can be used to modify one or more operational parameters (e.g., pump speed, value open/close percent, temperature, pressure, etc.) of the facility. In this manner excess raw material orders (e.g., spoilage, etc.) can be reduced, shipping can be optimized, etc. Other benefits are possible. For example, a storefront can use the contributions of trend and seasonality to a product sales forecast to increase and/or decrease product shipments over time.

Figure 4:
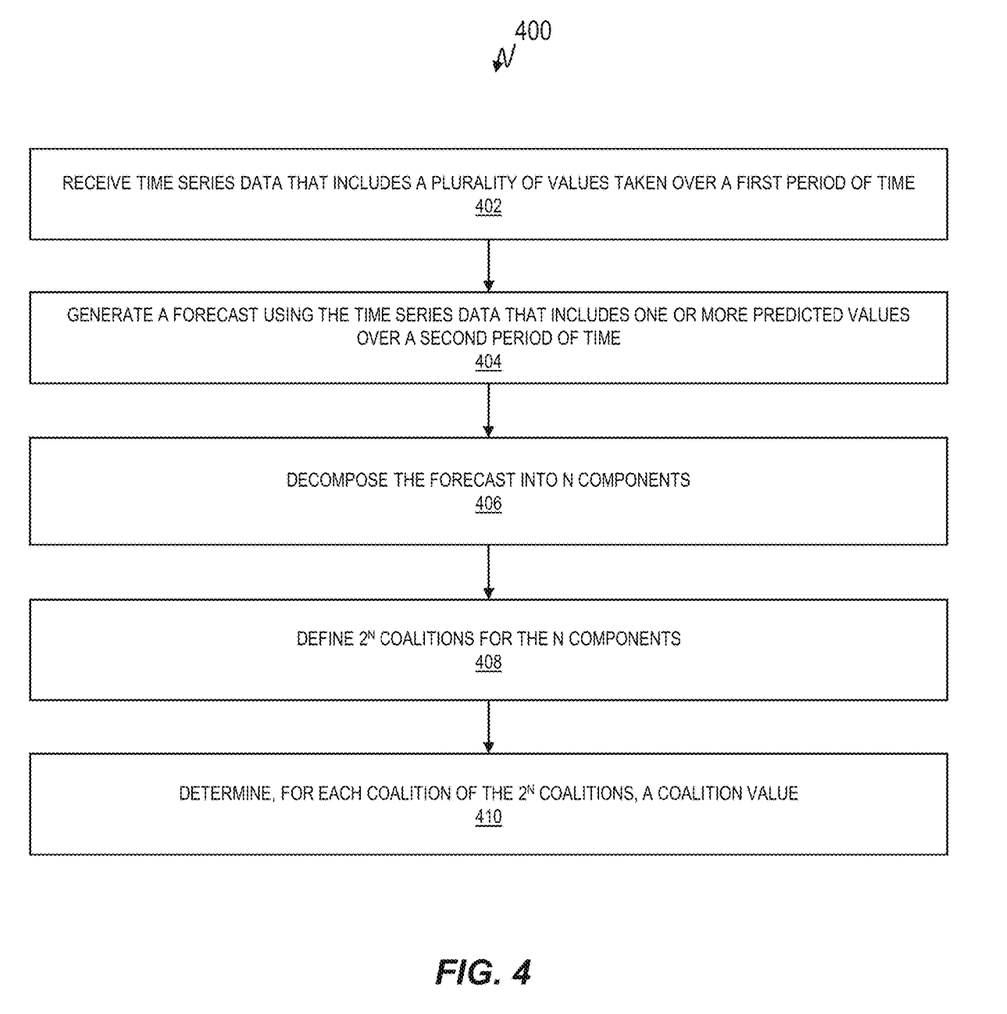
FIG. 4 is a flowchart in accordance with one or more embodiments of the present invention.

Referring now to FIG. 4, a flowchart 400 for decomposing trend and seasonality components in a forecast of parametric time series data is generally shown according to an embodiment. The flowchart 400 is described in reference to FIGS. 1-3B and may include additional blocks not depicted in FIG. 4. Although depicted in a particular order, the blocks depicted in FIG. 4 can be rearranged, subdivided, and/or combined.

At block 402, time series data is received. The time series data can include a plurality of values taken over a first period of time.

At block 404, a forecast is generated using the time series data. In some embodiments, the forecast includes one or more predicted values over a second period of time. In some embodiments, generating the forecast includes determining the one or more predicted values using a simple exponential smoothing model trained on the plurality of measured values.

At block 406, the forecast is decomposed into N components. In some embodiments, the N components include a trend component and a seasonality component.

At block 408, $2^N$ coalitions are defined for the N components. In some embodiments, the $2^N$ coalitions include a base coalition absent the N components, a complete coalition having all N components, and a plurality of coalitions corresponding to all possible remaining combinations of the N components. For example, for a 2 player coalition game between trend and seasonality, the four coalitions include a base coalition (no trend, no seasonality), a complete coalition (both trend and seasonality), a trend only coalition, and a seasonality only coalition. In some embodiments, each coalition of the $2^N$ coalitions is defined using a unique model definition (refer to Table 1 for example model definitions in a 2 player coalition game between trend and seasonality).

At block 410, a coalition value is determined for each coalition of the $2^N$ coalitions. In some embodiments, determining the coalition value for a respective coalition includes determining a Shapley value for the coalition. In some embodiments, the Shapley value for each respective coalition defines a contribution of the respective coalition to at least one of an error of fit and a predicted value of the forecast.

Technical advantages and benefits include the decomposition of trend and seasonality components in a forecast of parametric time series data. Systems built according to one or more embodiments can identify the separate contributions of trend and seasonality to an error of fit and/or to a predicted value in a forecast. Aspects of the present disclosure can relate to a user, plainly, the relative strengths of trend and seasonality within time series data. Additionally, trend and seasonality decompositions generated as described herein can be used by downstream processes, such as change point detection systems, to detect inflection points where trend and seasonality of a time series change over time. In change point detection applications, users generally wish to compare the relative strengths of trend and seasonality for two (or more) different parts of the time series. Notably, change point detection is straightforward when the relative strengths of trend and seasonality are determined according to one or more embodiments.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/ connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
receiving time series data comprising a plurality of values taken over a first period of time;
generating a forecast using the time series data, the forecast comprising one or more predicted values over a second period of time;
decomposing the forecast into N components;
defining $2^N$ coalitions for the N components; and
determining, for each coalition of the $2^N$ coalitions, a coalition value;
wherein the $2^N$ coalitions comprise a base coalition absent the N components, a complete coalition having all N components, and a plurality of coalitions corresponding to all possible remaining combinations of the N components.

2. The computer-implemented method of claim 1, wherein generating the forecast comprises determining the one or more predicted values using a simple exponential smoothing model trained on the plurality of values.

3. The computer-implemented method of claim 1, wherein the N components comprise a trend component and a seasonality component.

4. The computer-implemented method of claim 1, wherein each coalition of the $2^N$ coalitions is defined using a unique model definition.

5. The computer-implemented method of claim 1, wherein determining the coalition value for a respective coalition comprises determining a Shapley value for the coalition.

6. The computer-implemented method of claim 5, wherein the Shapley value for each respective coalition defines a contribution of the respective coalition to at least one of an error of fit and a predicted value of the forecast.

7. A system having a memory, computer readable instructions, and one or more processors for executing the computer readable instructions, the computer readable instructions controlling the one or more processors to perform operations comprising:
receiving time series data comprising a plurality of values taken over a first period of time;
generating a forecast using the time series data, the forecast comprising one or more predicted values over a second period of time;
decomposing the forecast into N components;
defining $2^N$ coalitions for the N components; and
determining, for each coalition of the $2^N$ coalitions, a coalition value, wherein determining the coalition value for a respective coalition comprises determining a Shapley value for the coalition, and wherein the Shapley value for each respective coalition defines a contribution of the respective coalition to at least one of an error of fit and a predicted value of the forecast.

8. The system of claim 7, wherein generating the forecast comprises determining the one or more predicted values using a simple exponential smoothing model trained on the plurality of values.

9. The system of claim 7, wherein the N components comprise a trend component and a seasonality component.

10. The system of claim 7, wherein the $2^N$ coalitions comprise a base coalition absent the N components, a complete coalition having all N components, and a plurality of coalitions corresponding to all possible remaining combinations of the N components.

11. The system of claim 10, wherein each coalition of the $2^N$ coalitions is defined using a unique model definition.

12. A computer program product comprising a computer readable storage medium having program instructions embodied therewith, the program instructions executable by one or more processors to cause the one or more processors to perform operations comprising:

receiving time series data comprising a plurality of values taken over a first period of time;

generating a forecast using the time series data, the forecast comprising one or more predicted values over a second period of time;

decomposing the forecast into N components;

defining $2^N$ coalitions for the N components; and determining, for each coalition of the $2^N$ coalitions, a coalition value;

wherein the $2^N$ coalitions comprise a base coalition absent the N components, a complete coalition having all N components, and a plurality of coalitions corresponding to all possible remaining combinations of the N components.

13. The computer program product of claim 12, wherein generating the forecast comprises determining the one or more predicted values using a simple exponential smoothing model trained on the plurality of values.

14. The computer program product of claim 12, wherein the N components comprise a trend component and a seasonality component.

15. The computer program product of claim 12, wherein each coalition of the $2^N$ coalitions is defined using a unique model definition.

16. The computer program product of claim 12, wherein determining the coalition value for a respective coalition comprises determining a Shapley value for the coalition.

* * * * *